UNITED STATES PATENT OFFICE.

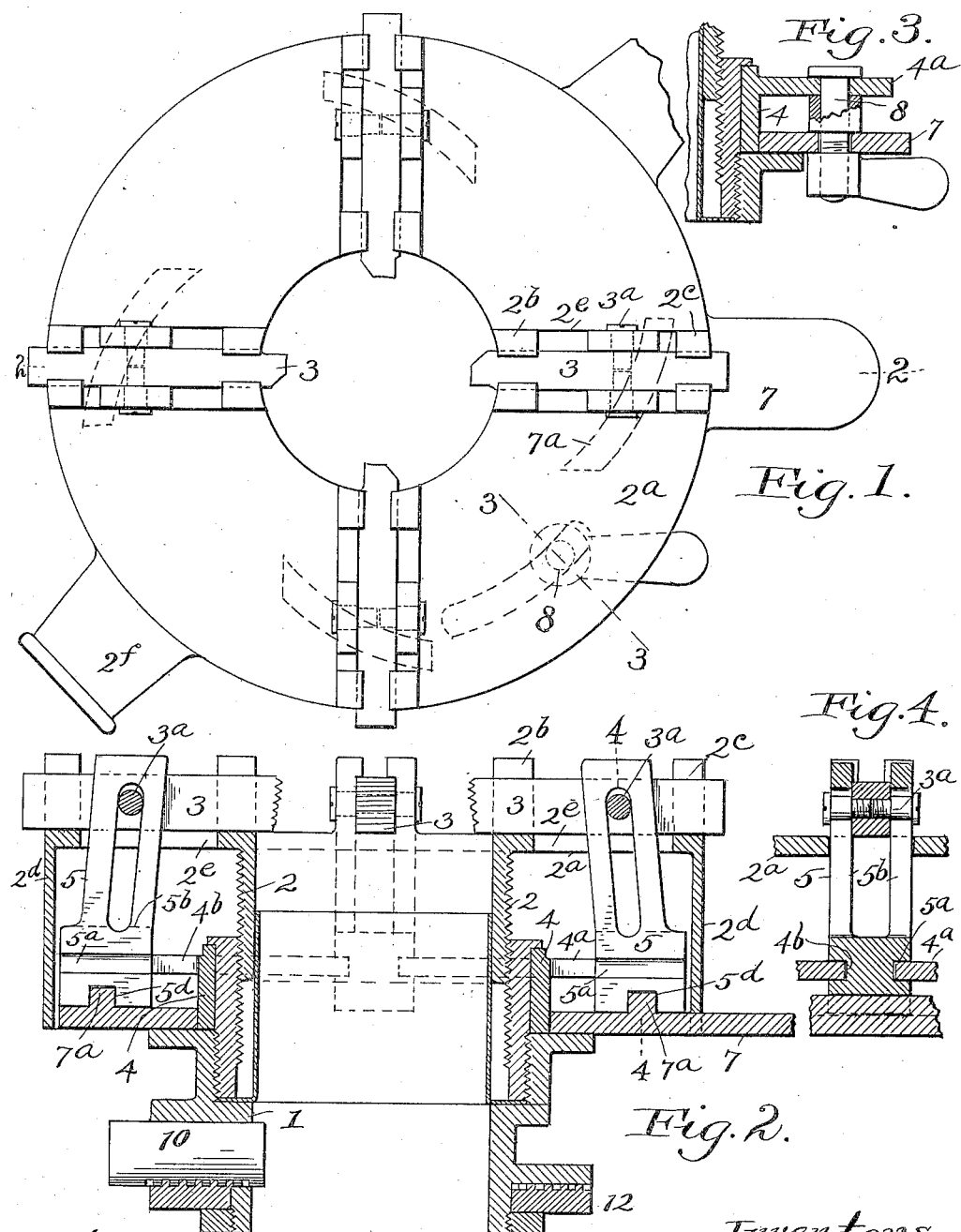

RUSSELL B. TEWKSBURY AND HERMAN W. OSTER, OF CLEVELAND, OHIO, ASSIGNORS TO THE OSTER MANUFACTURING COMPANY, OF CLEVELAND, OHIO, A CORPORATION OF OHIO.

DIE-STOCK.

1,082,282.  Specification of Letters Patent.  Patented Dec. 23, 1913.

Application filed April 22, 1912. Serial No. 692,292.

*To all whom it may concern:*

Be it known that we, RUSSELL B. TEWKSBURY and HERMAN W. OSTER, citizens of the United States, and residents of Cleveland, in the county of Cuyahoga and State of Ohio, have invented a certain new and useful Improvement in Die-Stocks, of which the following is a full, clear, and exact description.

This improvement in die stocks has for its objects to provide an efficient practical die stock of reasonable first cost, which may be adjusted to cut threads on work of different diameters, and which is also capable of being embodied in such form as will cause or allow the dies to gradually recede as they cut the thread, to the end that the finished work shall have what is known as a tapered thread.

The invention has for its primary novel feature of construction the use of templet bars which severally engage with and control the position of the dies, and a ring which rotates with the die carrier but shares with the work holder its condition as to longitudinal movement relative to the die carrier, said templet bars being adjustable on said ring simultaneously toward or from the axis of the tool so as to adapt the tool to cut thread on work of different diameters.

This construction, and other subordinate improvements are clearly shown in the drawing, are hereinafter fully described and are accurately defined in the appended claims.

In the drawing, Figure 1 is a front end view of a die stock embodying this invention. Fig. 2 is a longitudinal section thereof in the plane indicated by line 2—2 on Fig. 1. Fig. 3 is a longitudinal section through a part of the tool in the plane indicated by line 3—3 on Fig. 1. Fig. 4 is a longitudinal section in the plane indicated by line 4—4 on Fig. 2.

The work holder 1 is of familiar construction, being a built up member of tubular form so that the pipe or other cylindrical piece of work to be threaded may be passed through it, and being provided with radially movable clamp pins 10, and carrying a cam plate 12 which engages with said pins so that they may all be moved simultaneously in the clamping or releasing direction. The die carrier 2 is likewise tubular, and is capable of moving rotatably and longitudinally relative to the work holder. In the construction shown the die carrier has its rear end externally threaded so that it may screw into the internally threaded work holder; wherefore, as the die carrier is turned relatively to the work holder, it will move longitudinally relatively thereto at such a rate as is determined by the pitch of the engaging threads upon these two parts. At the front end of the die carrier is an outwardly extended flange 2ª which is provided with a plurality of pairs of forwardly projecting lugs 2ᵇ and 2ᶜ in which are formed radial guideways for the chasers or dies 3. A rearwardly extended cylindrical flange 2ᵈ is also formed on the flange 2ª and serves as a housing to inclose the ring 4 and the rear parts of the templet bars carried thereby.

A ring 4 is rotatably mounted upon the work holder in an annular groove so that it may be rotated on the work holder but cannot move longitudinally thereon. Integral with this ring is an outwardly extended flange 4ª which lies in a plane at right angles to the axis of the tool. In this flange are as many radial guideways 4ᵇ as there are dies. These guideways are in the form of radial slots extending from the outer periphery of the flange inward.

Die controlling templet bars 5 are movably mounted in these guideways. That is to say, these templet bars have grooves 5ª in their edges which embrace the sides of the guide slots 4ᵇ. The templet bars extend from the flange 4ᵇ longitudinally forward, each passing through a slot 2ᵉ in the flange 2ª and between the side wall of said slot and the associated die so as to be in substantial contact with both. This particular construction has for its object to furnish such a guide for the templet bars that they and the ring with which they are connected must rotate with the die carrier, but may be moved longitudinally with reference thereto. In the construction shown each templet bar has two arms and they lie on opposite sides of and in contact with the associated die, which, of itself, provides suitable guides for said templet bars. Each of these arms has a guide for engagement with the associated die so as to control the position thereof. If the die stock is to be organized so that it will cut tapered threads on pipe or other cylindrical work, these guides must be inclined to the axis of the stock. In the construction shown these guides are inclined slots 5ᵇ in said arms. Pins 3ª which are fixed to the dies and project laterally therefrom enter these slots. It is obvious that when the work holder is fixed to the work and the die carrier is moved rotatably and longitudinally relative to the work holder, as will be the case when threads are being cut, each die will be permitted to move, or caused to move, according to circumstances, outward or inward, or not at all, depending upon the direction in which the slot is inclined, or whether it is inclined at all.

In order to cause the templet bars to move simultaneously and equally in the guideways radially outward or inward a cam plate 7 is provided. This is rotatively mounted on the ring 4. It has cam scrolls or ribs 7ª which enter corresponding notches 5ᵈ in the rear ends of said templet bars. By turning this cam plate relatively to the ring these templet bars are caused to move radially outward or inward, and this compels a like movement of the dies, which movement adjusts the tool to thread work of different diameters.

When the cam plate has been turned so as to properly adjust the dies, it must be fixed to the ring, while the tool is cutting the thread. A bolt 8 which passes down through the flange and through an arcual slot in the cam plate and through a distance sleeve placed between the flange and cam plate, has on its rear end a nut provided with a handle whereby it may be turned so as to clamp the cam plate and ring together.

In employing this tool to cut a tapered thread the die carrier will be screwed out of the work holder as far as desired. The work holder being placed so as to embrace the work to be threaded, and being fixed thereto, the die carrier is now turned by any suitable means, as, for example, handles fixed in sockets 2ᶠ which are integral with the die carrier. As the die carrier turns relative to the work holder, it likewise moves longitudinally. It will be remembered that the ring has no longitudinal movement on the work holder, and it will be evident that since the guide arms which are fixed to the ring straddle the dies the ring must turn with the die carrier. Therefore, the pins on the dies will slide rearward in the inclined slots in these guide arms and will thereby be slowly retracted as the thread is being cut.

Having described our invention, we claim:

1. In a die stock, the combination of a tubular work holder, a tubular die carrier which is movable rotatively and longitudinally with respect to the work holder, dies movably mounted on said die carrier, a ring which is rotatively mounted on the work holder but is held against longitudinal movement thereon, means compelling said ring to rotate with the die carrier, templet bars which are supported by said ring and are movable thereon toward and from the axis of the die stock, means for simultaneously moving all of said templet bars toward or from the axis of the die stock, and operative connections between each templet bar and an associated die.

2. In a die stock, the combination of a tubular work holder, a tubular die carrier which is movable rotatively and longitudinally with respect to the work holder, dies movably mounted on said die carrier, a ring which is rotatively mounted on the work holder but is held against longitudinal movement thereon, means compelling said ring to rotate with the die carrier, templet bars which are severally adjustably secured to said ring and serve to control the position of said dies, a cam plate rotatably mounted on said ring and having cam scrolls which engage said templet bars, and means for connecting said cam plate and ring when the cam plate has been moved into the desired position relative to said ring.

3. In a die stock, the combination of a tubular work holder, a tubular die carrier which is movable rotatively and longitudinally with respect to the work holder, dies movably mounted on said die carrier, a ring which is rotatively mounted on the work holder but is held against longitudinal movement thereon, means compelling said ring to rotate with the die carrier, templet bars which are adjustably fixed to said ring, each having a guide slot, pins fixed to said dies and extended into said guide slots, and means carried by the die carrier engaging said templet bars and permitting them to move longitudinally but not rotatively with respect to said die carrier.

4. In a die stock, the combination of a tubular work holder, a tubular die carrier which is movable rotatably and longitudinally with respect to the work holder, dies movably mounted on the die carrier, a ring which is rotatably mounted on the work holder but is held against longitudinal movement thereon, said ring having as many substantially radial guideways as there are dies, means compelling the ring to rotate with the die carrier, a templet bar mounted in each of the said radial guideways on the ring, means for simultaneously moving said templet bars in said guideways, and an operative connection between each templet bar and an associated die.

In testimony whereof, we hereunto affix our signatures in the presence of two witnesses.

RUSSELL B. TEWKSBURY.
HERMAN W. OSTER.

Witnesses:
H. R. SULLIVAN,
E. L. THURSTON.

Copies of this patent may be obtained for five cents each, by addressing the "Commissioner of Patents, Washington, D. C."